United States Patent [19]

Witt

[11] Patent Number: 5,375,049

[45] Date of Patent: Dec. 20, 1994

[54] SURGERY LAMP

[75] Inventor: Jürgen Witt, Mömbris, Germany

[73] Assignee: Heraeus Instruments GmbH, Hanau, Germany

[21] Appl. No.: 994,498

[22] Filed: Dec. 21, 1992

[30] Foreign Application Priority Data

Dec. 21, 1991 [DE] Germany .................... 4142634

[51] Int. Cl.$^5$ ............................................. F21S 1/02
[52] U.S. Cl. ............................. 362/418; 362/33; 362/804; 439/7
[58] Field of Search ............... 362/33, 287, 403, 418, 362/419, 427, 428, 804; 252/572; 439/5, 7; 192/21.5

[56] References Cited

U.S. PATENT DOCUMENTS

| 2,919,098 | 12/1959 | Mull et al. ............... 362/804 |
| 3,601,598 | 8/1971 | Horn ........................ 362/418 |
| 4,444,298 | 4/1984 | Stangroom ............... 192/21.5 |
| 4,483,788 | 11/1984 | Stangroom et al. ...... 252/578 |
| 4,494,177 | 1/1985 | Matthews ................. 362/418 |
| 4,668,417 | 5/1987 | Goossens et al. ........ 252/75 |
| 4,782,927 | 11/1988 | Sproston et al. ......... 192/21.5 |
| 4,898,266 | 2/1990 | Garrett et al. ........... 192/21.5 |
| 4,974,135 | 11/1990 | Wen-tsung ............... 362/287 |
| 4,986,689 | 1/1991 | Drutchas .................. 192/21.5 |
| 5,159,168 | 10/1992 | Portmann et al. ........ 439/5 |

FOREIGN PATENT DOCUMENTS

| 695806 | 10/1964 | Canada ..................... 252/572 |
| 0178278 | 4/1986 | European Pat. Off. . |
| 2536832 | 11/1983 | France . |
| 1097928 | 1/1961 | Germany . |
| 1810552 | 6/1970 | Germany . |
| 2802494 | 1/1978 | Germany . |
| 676106 | 7/1952 | Italy ........................ 439/5 |
| 63-082873 | 4/1988 | Japan . |
| 7409286 | 1/1975 | Netherlands ............ 362/804 |
| 146846 | 1/1962 | U.S.S.R. .................. 439/5 |

Primary Examiner—Ira S. Lazarus
Assistant Examiner—Y. Quach
Attorney, Agent, or Firm—Felfe & Lynch

[57] ABSTRACT

In a surgery lamp with at least one arm which is divided by several uniaxial joints consisting of several parts, a lamp head being fastened to its one end, and its other end is held stationary, the arm has a spring counterbalance for counterbalancing the lamp head when it is moved; the locking of the joints is electrically variable, and the release for adjustment followed by locking is performed through a switch. The joints are constructed with a sealed channel disposed in one joint member concentrically with the joint axis filled with an electroviscous fluid into which projections of the other joint member reach. The annular channel and the members form a pair of poles for the application of a voltage to the electroviscous fluid, whereby the joint members can be rendered relatively immovable.

9 Claims, 4 Drawing Sheets

SURGERY LAMP

BACKGROUND OF THE INVENTION

The present invention relates to a surgery lamp of the type having at least one arm with a spring equalizer for counterbalancing the lamp head, a uniaxial joint associated with the arm, and electrical means for locking and unlocking the joint.

Such surgery lamps are suspended movably on an arm and must be held securely in the working position once they have been set, but it must also be easy to release and readjust them to a new working position. In the head of the surgery lamp a plurality of individual projectors are disposed so as to eliminate shadows in the operating field that is to be illuminated, while possibly due to additional accessories such as recording apparatus, focusing systems etc., the individual lamp head acquires a relatively great mass which varies according to the nature of the accessories and can lead also to a shift in the center of gravity. The result will be increases in the moment of inertia and in some cases imbalances with regard to adjustability. Large lamps have a plurality of individual projectors as light sources. They produce heat whose input into the operating field is prevented or reduced by devices such as cold-light mirrors, filters etc., thereby further increasing the mass of the lamp head. Nevertheless the lamp head must be suspended in the operating room to send light freely in any desired direction and must be easy to move. It must remain fixed in the set position immediately after it is adjusted, without drifting.

It is known to hang operating lamps from the ceiling on a vertical pivot which also conceals power lines. This pivot is joined by one or more substantially horizontal or inclined arms which are joined together by joints with vertical or tilted axes. The lamp head in practice is often situated in a forked free end of the last arm, all the arms forming the adjustable suspension, and can turn in the fork on an axis that is horizontal in the normal state.

An operating lamp with a plurality of projectors on a single mounting point is disclosed, for example, in German Patent 1,193,897.

A more or less great lateral distance from the mounting point is achieved by swinging the lamp about the vertical axes. The vertical distance from the mounting point is made adjustable by joints between the arms and having horizontal axes in the normal state.

With increasing lateral departure from the mounting point, the moment contributed by the mass of the lamp head acts around these horizontal axes and has to be counterbalanced.

It has already been proposed to solve the problem with rails attached to the ceiling of the operating room, on which a laterally running carriage is suspended, on which the lamp head is located with an additional linkage (cf. German Patents 863,528, 1,020,288, 1,058,447 or 1,102,673). In this design of the suspension of operating lamps additional problems are created by the fact that the operating table, as the field to be illuminated, has to be aligned with the rails. If the rail is mounted fixedly in the operating room, the freedom of movement of the operating lamp is then limited. Another serious problem arises from the fact that an exposed rail system above an operating field is a source of septic contamination which cannot be accepted in the sterile operating room.

In order to be able to retain the arm suspension well sealed off against this and nevertheless minimize the problems occurring in the case of great changes of position, it has been proposed to provide a plurality of mounting points on the ceiling (German Patent 927,864 or 1,156,363). These solutions minimize the problem of balancing, but limit the mobility and easy adjustability of an operating lamp. In practice, these solutions have not been widely accepted. The subject of the present invention, however, is addressed to surgery lamps which are suspended at a plurality of mounting points.

In practice, the problem here involved of balancing the weight has been dealt with by a proven balancing system using springs in the arms of the suspension. In the joints between the arms there is associated with each axis that is horizontal in the normal position a spring which extends in one of the adjacent arms, and it is joined by means of a lever to the attached arm so that the force of the spring counterbalances the connected weight (cf. German patents 1,097,928 and 1,810,552, which corresponds to U.S. Pat. No. 4,517,632 . This equalization of weights by springs cannot be a complete solution. The nonlinear spring characteristic and the increase of the moment of the weight with increasing distance from the mounting point cannot be completely matched to one another, inasmuch as the distance from the mounting point depends predominantly on the movement about the vertical axes of the suspension. Therefore a residual moment must be reckoned with, part of which cannot be compensated, and which must be otherwise taken up and held if a stable fixation of the lamp head is to be accomplished. On this it was proposed long ago (namely in German Patent 1,012,571) to prevent the tilting movement of the lamp head about a substantially horizontal joint by shifting the equalizing spring outwardly and combining it with a spindle drive to be operated by hand. Each adjustment then requires, however, that the spindle be rotated by hand. A rapid movement about the joint thus bypassed is not possible. But surgeons precisely require the possibility of quick correction of the incidence of the light in the course of an operation in order to be able to adapt the light to the situation of the moment. Any dentist's lamp must offer this possibility.

Motorized adjustments with self-locking motors in the arms of the suspension do permit the desired adjustment depending on small deflecting movements of a handle on the lamp head in the direction of the desired adjusting movement (German patent 1,797,040), but this motorized adjustment often has a still too long response time. The limited motor speed does not produce an immediate readjustment, and a corresponding overshoot control circuit has to be optimized so that when the end point of the movement is reached it will not be overshot and require readjustment. In practice, therefore, the free adjustment of a surgery lamp that can be performed directly by hand is preferred. To facilitate this method of adjustment it is proposed in German Patent Disclosure Document 32 43 700 (which corresponds to U.S. Pat. No. 4,517,632) to provide the joints for the mounting of the lamp body with a brake which can be operated via electromagnets when the surgeon or other person actuates a sensor on the lamp head. In practice, the wear on the frictionally interacting brake elements caused by the operation of the adjustment must be dealt with, and increasing wear of the brake elements even in a single joint can make the lamp no longer reliable in operation.

SUMMARY OF THE INVENTION

The invention is addressed to the problem of making available, for a surgery lamp movably mounted in an operating room with at least at one mounting point, a secure system for locking up the joints carrying the lamp head, and for releasing them for any adjusting movement. The suspension includes a plurality of arms articulated together on a plurality of vertical axes and axes which are horizontal in the normal position, which will be virtually free from wear and inexpensive to manufacture, and can be operated with very little maintenance.

This problem is solved by providing each joint with a liquid-tight annular channel disposed concentrically to the joint axis and filled with an electroviscous fluid. Joint members on axially opposed sides of the channel form opposite poles for application of a voltage to the fluid. A projection extending into the fluid from one of the members prevents relative rotational movement when viscosity is sufficiently increased. The voltage supply is variable between zero and a maximum so that the electroviscous fluid can be set to a completely fluid and a completely solid state. The adjustment can be performed through a controlled switch whose control input is connected to a sensor actuated when the lamp position is changed and is connected, if desired, to a control circuit in which a comparison is made of the alignment of the lamp head with a given guiding magnitude, such as for example the desired angle setting, corresponding to the beam direction, any departure from the rule resulting in a signal to the control input.

Electroviscous fluids are known (e.g., DE-A 28 02 494, U.S. Pat. No. 4,483,788 and U.S. Pat. No. 4,668,417). The use of a viscosity controllable by voltage in a coupling fluid that is provided in an annular channel in the joint between the suspension arms of a surgery lamp results in considerable advantages. It is made possible by the invention to control electrically a continuous transition from a completely locked joint to a released joint. The transition can be adjusted between "soft" and "hard," i.e., with no delay.

An important advantage over electromagnetically operated braking elements is the virtually negligible emission of noise pulses by the electromagnetic field, which would result in undesirable interference in the operating room on account of the electrical and electronic apparatus used therein.

DETAILED DESCRIPTION OF THE PREFERRED EMBODIMENT

Figure 1:
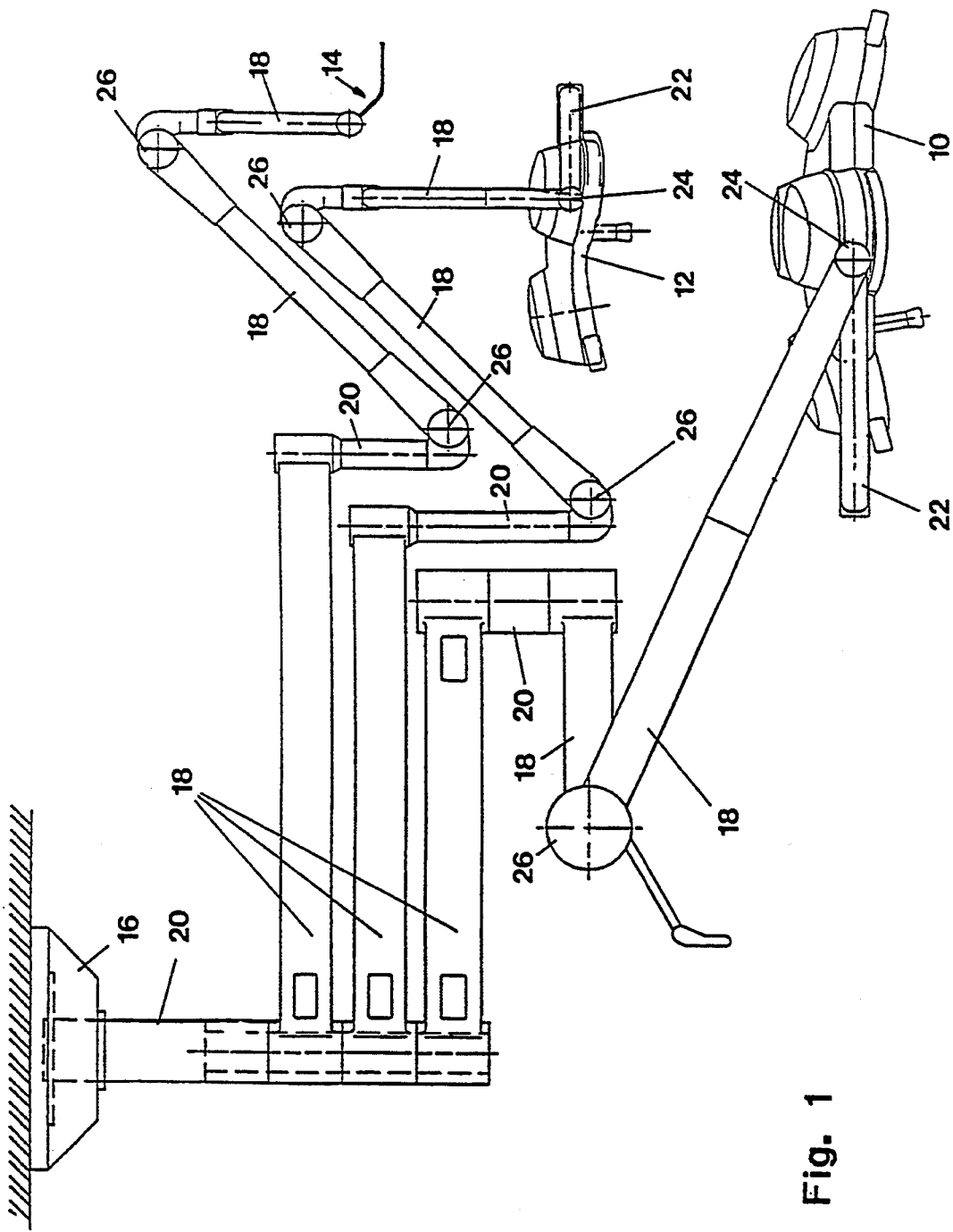
FIG. 1 is a side view of a suspension of a combination of several surgery lamps on a ceiling-mounted shaft.

FIG. 1 shows a conventional movable suspension of one or more lamp heads 10 and 12 and other surgical apparatus 14 on a ceiling mount 16. The suspension includes horizontally rotated arms 17, vertical shafts 20, and articulated arms 18. The lamp heads 10 and 12 can rotate on a full fork or half fork 22 about an axis 24 which is horizontal in the normal state but can assume any position in space after the lamp head 10 or 12 has been positioned with respect to an operating table which is not shown here.

The shafts 20 have vertical axes about which the arms 18 can swing relatively easily in comparison with joints 26 with a horizontal axis. However, it is known from the state of the art, namely from the above-mentioned German Patents 927,864, 1,156,365 and 1,156,728, that problems arise in practice with the movement of a surgery lamp about these joints with vertical axes. The present invention can therefore be used to advantage in these shafts 20 instead of the solutions presented in the above-mentioned patents.

Essentially, however, the idea is to apply the invention in the joints 26 that have contiguous arms 18, which like the axes 24 are normally disposed horizontally. Moments of inertia caused by the weight of the apparatus 14 or lamp heads 10 and 12 act on these joints. This is the case especially when a lamp head 10 or 12 is brought to a position far removed from the mounting point 16, so that adjacent arms 18 assume an outstretched or virtually straight position. In arriving at the invention the idea was to use spring-type counterbalancing arms known in the state of the art, so that a substantial counterbalancing of the moments of inertia is provided by the springs contained inside of the arms. However, the residual and inevitably uncompensated moments of inertia call for additional measures. The measures known in this regard assume spring equalization, and are applied only as additional measures. In the case where an electroviscous system in accordance with the present invention is used in the joints 26, it is possible to refrain at least partially from using spring equalization or other means of support.

In each joint 26 there is one element of the joint on the suspension side and one on the lamp side, which are joined together around a pivot axis. In the application of the present invention it matters not which joint element is associated with which side, the weight-creating or the weight-bearing side. Even if spring balancing is used it can be associated with the arm on the suspension side or the lamp side. Consequently, and because the joints are completely encapsulated to preserve asepsis in the operating room, the two necessary joint elements can be considered to be interchangeable.

Figure 2:
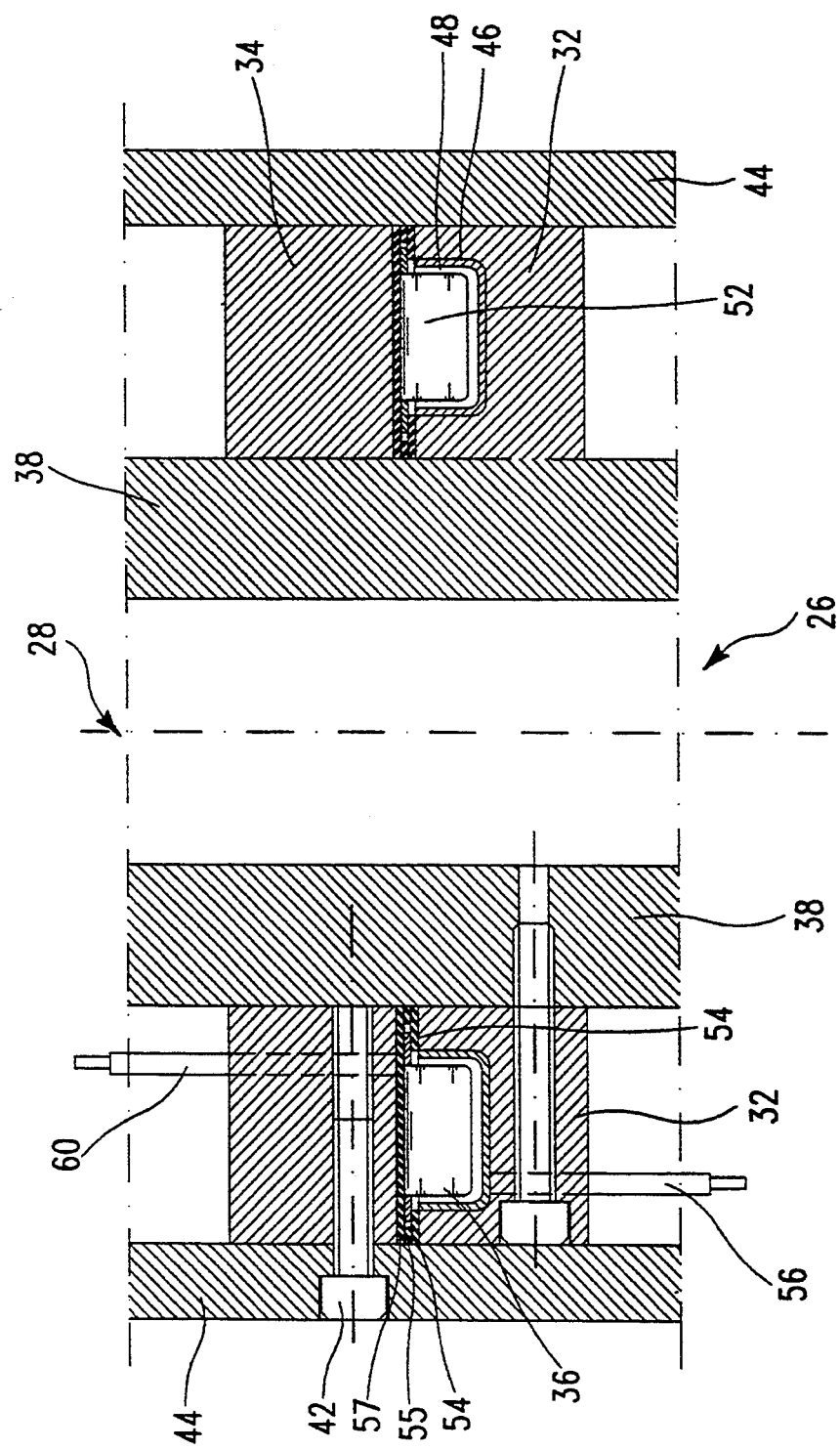
FIG. 2 is a section taken through a joint in accordance with the present invention.
Figure 3:
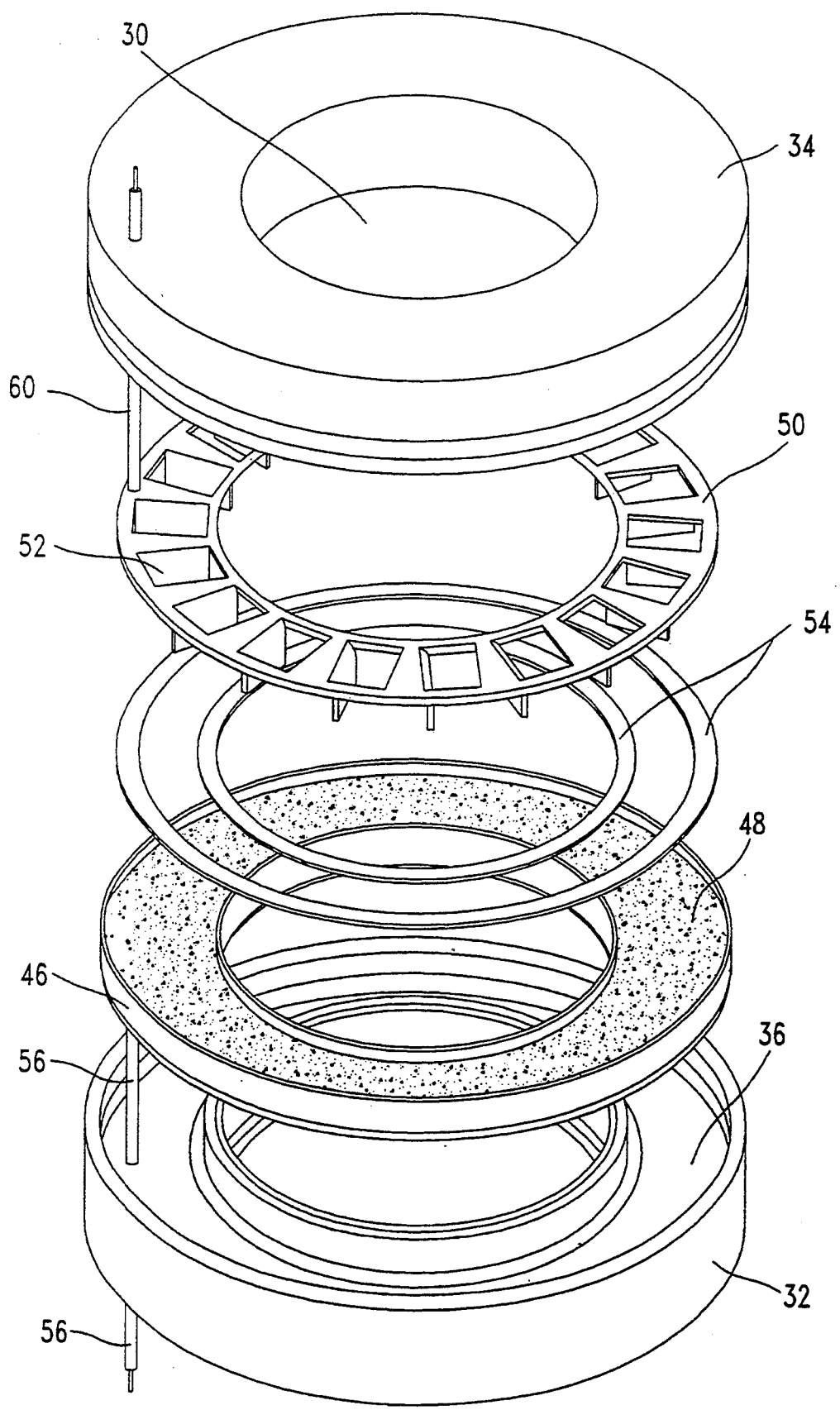
FIG. 3 is an exploded perspective view of the interacting parts.

The joint elements modified in accordance with the invention will be further explained below with the aid of FIGS. 2 and 3. In FIG. 2 can be seen a section through a uniaxial joint 26 with the axis 28. FIG. 3 shows the parts of the joint 26 in an exploded perspective view, in which the relative positions of the parts and their functional connection can be seen. In this embodiment the joint 26 is given an annular configuration with a central opening 30 for versatility and for the accommodation of cables, tubes or the like, in which therefore the axis 28 is free. Radially outward therefrom the joint has two case halves 32 and 34 which are fitted together and which can be connected to the arms 18 and are interchangeable in the meaning mentioned above. These case halves contain an initially open annular channel 36 which when they are assembled (FIG. 2) becomes a sealed annular channel. The bottom case half 32 in FIGS. 2 and 3 is attached to an internal tube 38 by a bolt 40 and the top case half 34 is attached to an external tube 44 by a bolt 42. The two tubes 38 and 44 can be rotated against one another about the common axis 28, and are attached each to one of the arms 18 (not represented in FIG. 2). The joint 26 is the articulation about axis 28 between two arms 18 (FIG. 1).

Figure 3A:
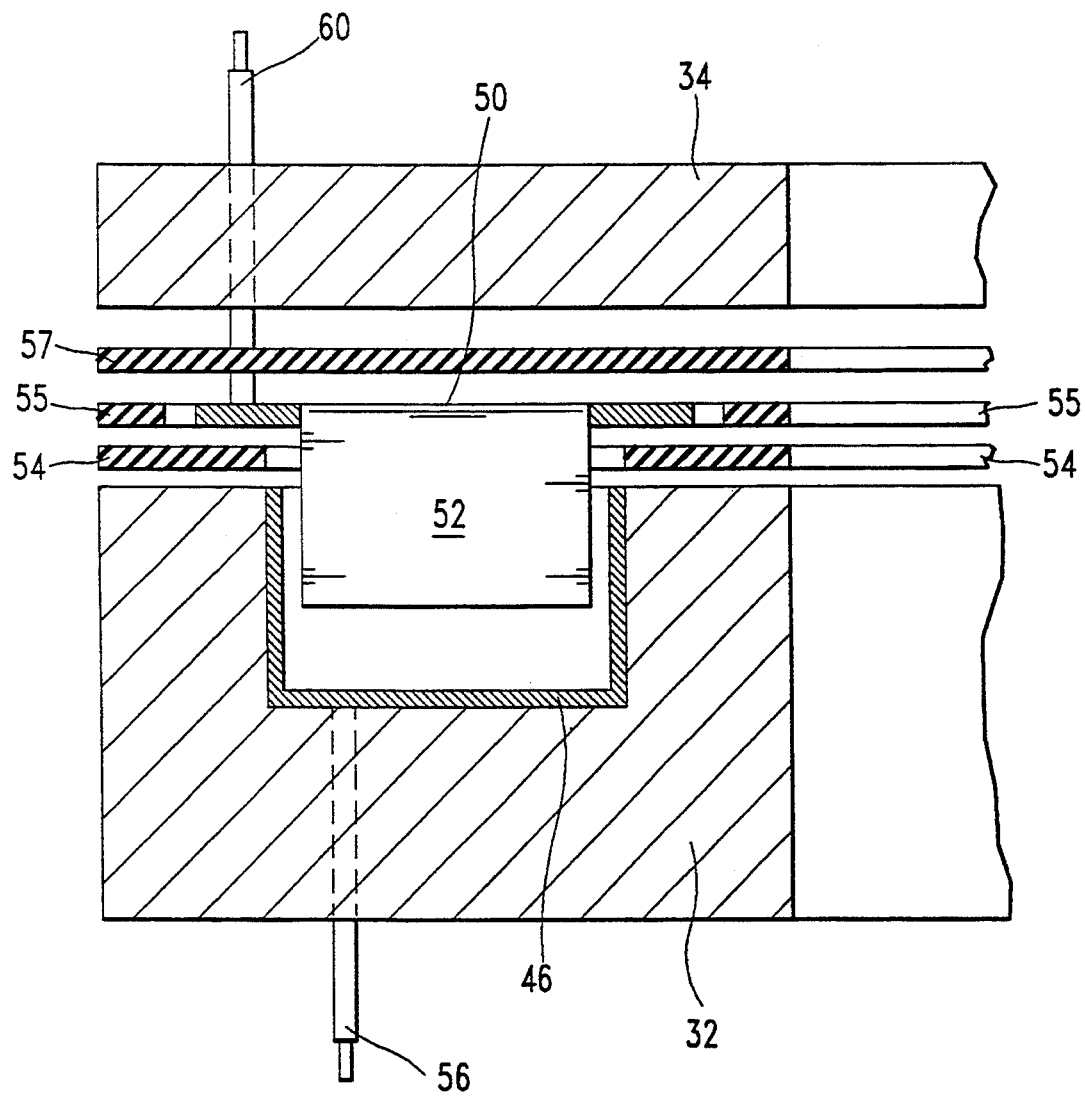
FIG. 3A is an exploded partial section view of case halves, vane ring, and insulating rings.

In the annular channel 36 there is an annular cup 46 for containing an electroviscous fluid. A vane ring 50 is mechanically fastened to the case half 34, but is electrically insulated from case half 34 and from the bottom case half 32 and the annular cup 46 by insulating rings of which two insulating rings 54 are shown below the vane ring 50 and rings 55, 57 shown above the vane ring (see FIG. 3A).

Mechanically, the vane ring 50 is affixed to the one case half 34 and the annular cup 46 to the other half 32. Upon a pivoting movement about the axis 28 a relative movement of the vanes 52 in the annular cup 46 takes place. The vanes 52 and annular cup 46 form at the same time a pair of electrical poles connected by electroviscous fluid 48. The annular cup 46 is for this purpose connected to an electrical terminal 56 and the vane ring 50 to an electrical terminal 60. If a voltage is applied to the terminals 56 and 60, the viscosity of the electroviscous fluid varies in proportion to the voltage between a liquid state and a solid state with more or less viscous intermediate states. In the liquid state the vanes 52 of the vane ring 50 can easily move circumferentially in the annular cup 46 as soon as the joint is moved about its axis 28. In the liquid state the fluid offers a low, movement-damping resistance to the movement. The joint is substantially freely movable. If the viscosity is changed by a different voltage, the fluid 48 first becomes viscous and hampers the movement of the joint. The joint in this intermediate stage is hard to move, which is often desirable. Upon further voltage change the electroviscous fluid 48 becomes solid and the two joint parts are fixed in their position with respect to one another.

The electrical adjustment of the viscosity of the electroviscous fluid can be performed in any desired manner. It will be expedient to apply the known technology such that by means of handles connected with a sensory circuit and disposed on the lamp heads, the viscosity can be controlled such that, if the handle is not touched, the electroviscous fluid assumes a virtually solid state so that the corresponding joint is locked. When the handle is actuated, a transition toward a certain easy fluidity is achieved, in which case each lamp head even with its released weight, i.e., uncounterbalanced weight, will be securely held by the hand, so that the lamp head can easily be turned to a different position in which, when the handle is released, the re-established viscosity of the electroviscous fluid will lock it.

I claim:

1. Surgery lamp comprising a lamp head, at least one arm, and a joint between said lamp head and said arm to permit articulated movement of said lamp head, said joint comprising
   first and second joint members which are mechanically connected and are rotatable relative to each other about a common axis, one of said joint members being fixed relative to said arm,
   a sealed annular channel between said joint members,
   projection means fixed to said first joint member and extending into said sealed annular channel,
   electroviscous fluid in said annular channel, and
   means for applying a voltage between said projection means and the second joint member.

2. Lamp according to claim 1 wherein said projection means comprise flat parts reaching into the annular channel, each flat part being in a radial and axial plane.

3. Lamp according to claim 2, further comprising a vane ring having vanes which form the flat parts.

4. Lamp according to claim 1 wherein
   said first joint member comprises an outer tubular portion and a first ring-like case half fixed inside said outer tubular portion, said projections being fixed to said first case half, and
   said second joint member comprises an inner tubular portion and a second ring like case half fixed outside said inner tubular portion, said second case half accommodating an annular cup in an axial surface thereof which faces said first ring like case half, said sealed annular channel comprising said annular cup.

5. Lamp according to claim 4 wherein said projection means and said annular cup are electrically insulated from said first joint member and are electrically connected.

6. Lamp according to claim 1 wherein said means for applying voltage comprises a sensor on said lamp head and a switch connected to said sensor.

7. Lamp according to claim 1 wherein one of said joint members is fixed relative to said arm and the other of said joint members is fixed relative to said lamp head.

8. Lamp according to claim 1 further comprising an additional arm connected by said joint, the other of said first and second joint members being connected to said another arm.

9. Lamp according to claim 1 wherein said annular channel is formed in said second joint member.

* * * * *